Figure 1:
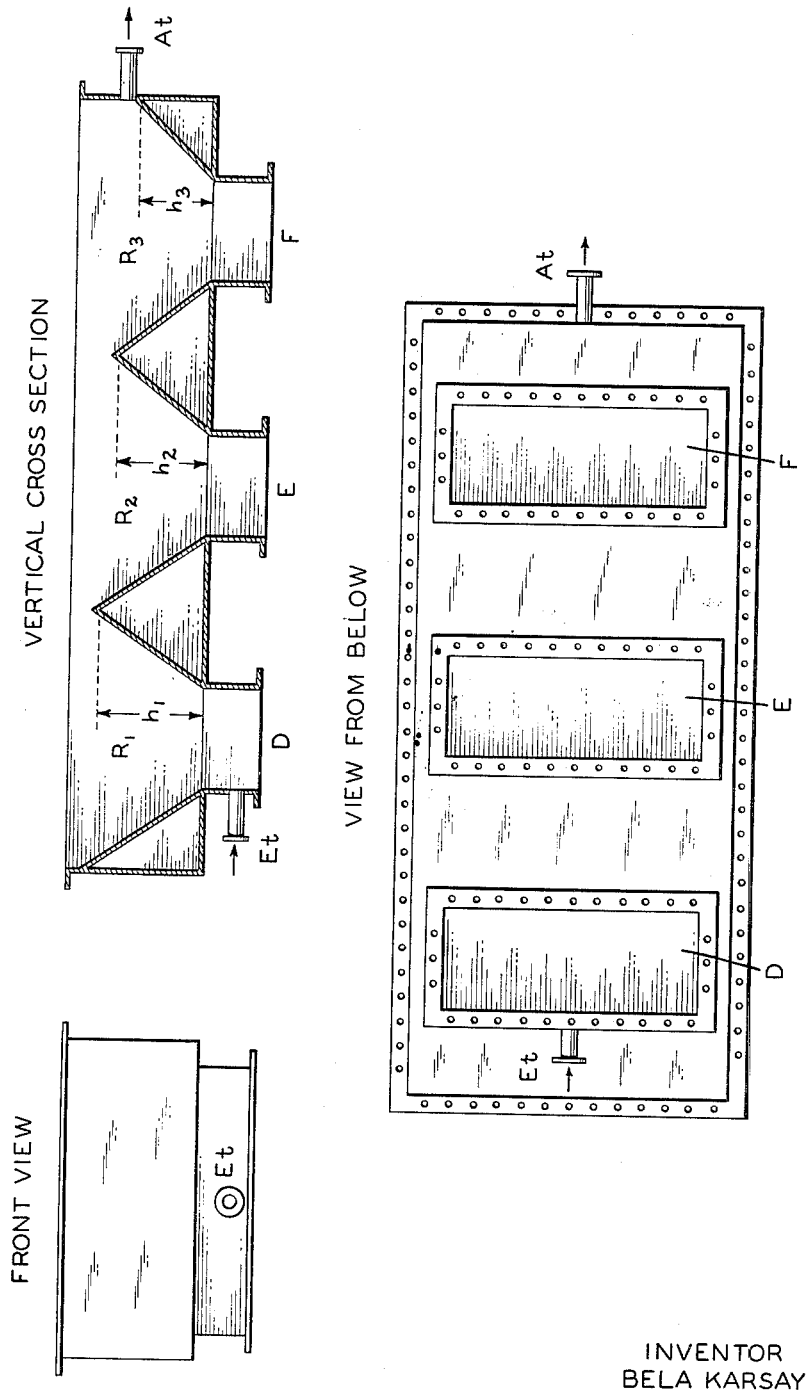

Aug. 7, 1962 B. KARSAY 3,048,473
PROCESS FOR THE DECOMPOSITION OF ACID SLUDGE INTO SULFUR
DIOXIDE, HYDROGEN SULFIDE, AND HYDROCARBONS
Filed Nov. 13, 1958 7 Sheets-Sheet 1

LOWER PART OF THE ACID SLUDGE DECOMPOSER APPARATUS

INVENTOR
BELA KARSAY
BY
ATTORNEY

Aug. 7, 1962 B. KARSAY 3,048,473
PROCESS FOR THE DECOMPOSITION OF ACID SLUDGE INTO SULFUR
DIOXIDE, HYDROGEN SULFIDE, AND HYDROCARBONS
Filed Nov. 13, 1958 7 Sheets-Sheet 3

INVENTOR
BELA KARSAY
BY
*Alvin Engelstein*
ATTORNEY

SLUDGE ACID SPRAY NOZZLE

A-A'
CROSS SECTION

Aug. 7, 1962 B. KARSAY 3,048,473
PROCESS FOR THE DECOMPOSITION OF ACID SLUDGE INTO SULFUR
DIOXIDE, HYDROGEN SULFIDE, AND HYDROCARBONS
Filed Nov. 13, 1958 7 Sheets-Sheet 5

APPARATUSES OF THE FIRST PHASE
OF THE ACID SLUDGE REGENERATION

INVENTOR
BELA KARSAY
BY
ATTORNEY

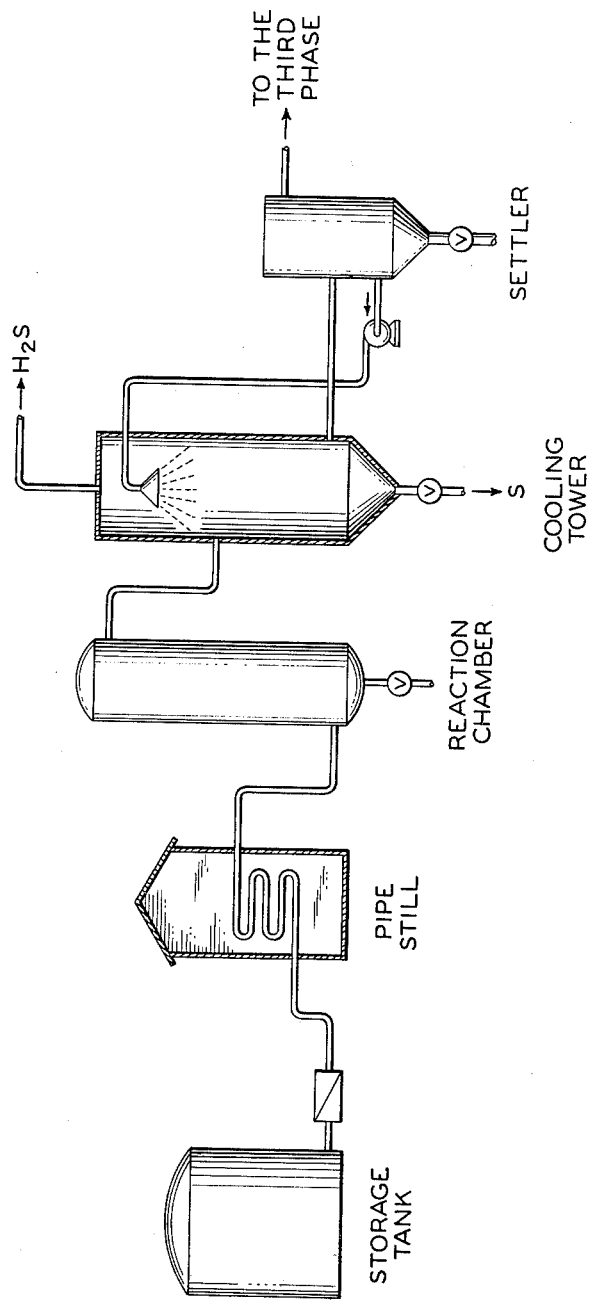

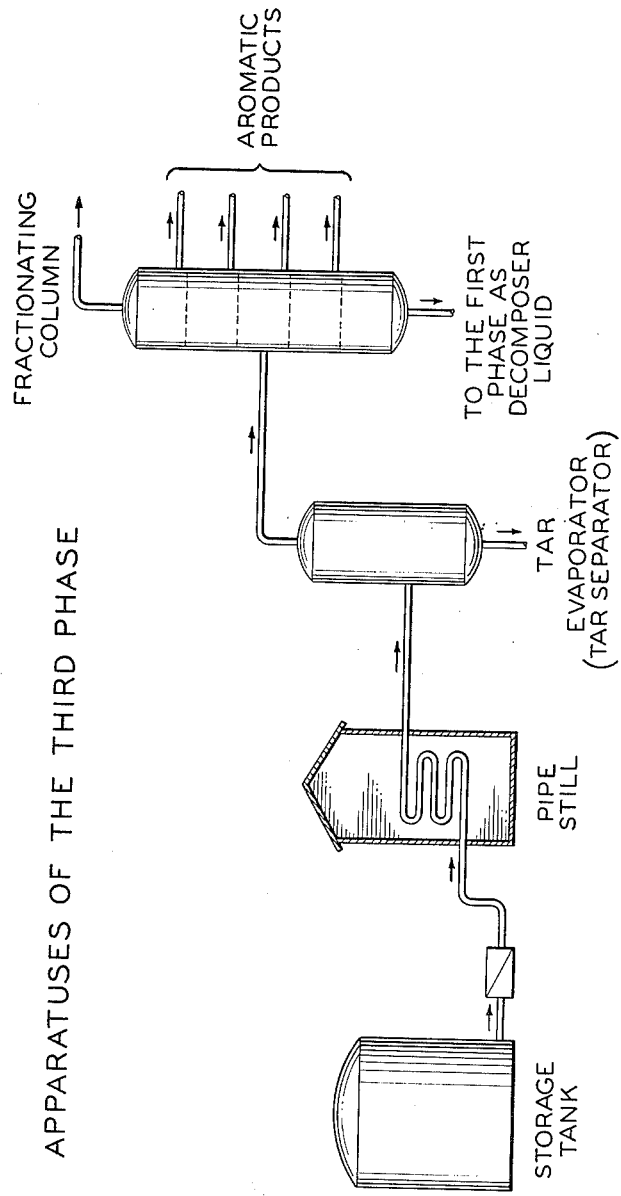

United States Patent Office 3,048,473
Patented Aug. 7, 1962

3,048,473
PROCESS FOR THE DECOMPOSITION OF ACID SLUDGE INTO SULFUR DIOXIDE, HYDROGEN SULFIDE, AND HYDROCARBONS
Bela Karsay, Flushing, N.Y., assignor to Allied Chemical Corporation, New York, N.Y., a corporation of New York
Filed Nov. 13, 1958, Ser. No. 773,588
Claims priority, application Germany Nov. 13, 1957
1 Claim. (Cl. 23—177)

I. PURPOSE OF THE TREATMENT

The petroleum products produced from crude oil by distillation do not have all the properties desired by commerce. Consequently, only a part of the distilled products can be used directly.

Most distillation products need a treatment, by which the impurities, such as sulfur compounds, unsaturated hydrocarbons, gum-like and asphaltic materials—which cause corrosion, aging, unsuitable color, odor, etc.—are removed.

Some of these impurities were present in the crude oil and got to the fractions during distillation while others formed in the course of the distillation by local overheating of the products.

II. SULFURIC ACID TREATMENT

Among the methods of chemical treatment of petroleum products, probably the sulfuric acid treatment is the most widely used. Sulfuric acid reacts with all constituents of the petroleum which cause corrosion, formation of gum, etc. It reacts with sulfur compounds, precipitates resinous and tar-like materials, improves the color, stability, to some extent it improves the odor of the products and dissolves the naphthenic acids and nitrogen bases.

Sulfuric acid forms a viscous mass of high specific gravity with these impurities, which is not soluble in the treated petroleum product and precipitates from them in the form of the so-called "acid sludge."

The quantity of the impurities removed by sulfuric acid, i.e. loss of the treatment, is different, but fairly considerable. It is between 0.5 and 8.0% in motor oils, 30 and 40% in cylinder oils and up to 60% in white oils, based on the untreated oils.

The quantity of the acid sludges is 30–50% higher than the loss of the treatment because they contain the sulfuric acid used in the treatment. It is, therefore, very important to utilize the acid sludge as economically as possible.

III. COMPOSITION OF THE ACID SLUDGES

The acid sludges are more or less viscous materials consisting of free sulfuric acid and organic compounds which are dissolved in it. As previously mentioned the free sulfuric acid is present in acid sludges in diluted form—caused by the diluting action of water formed during the sulfonation reaction—and has a concentration of about 65–75% (in which the dilution caused by the solution of organic materials is not considered).

Average quantity of free sulfuric acid present in acid sludges of various petroleum products are as follows:

| Type of Acid Sludge: | Density | % H$_2$SO$_4$ |
|---|---|---|
| Naphtha | 1.41 | 28.5 |
| Kerosene (normal) | 1.43 | 48.5 |
| Kerosene (high sulfur) | 1.66 | 76.6 |
| Gas oil | 1.22 | 30.9 |
| Medium lubricating oil | 1.19 | 24.7 |
| Heavy lubricating oil | 1.37 | 67.1 |
| Wax | 1.77 | 78.0 |

The organic compounds dissolved in the sulfuric acid are sulfonic acids of different nitrogen compounds, resins and asphaltic materials, polycyclic naphtheno-aromatic compounds and, to a certain extent, naphthenic acids. Furthermore, organic sulfides, polysulfides and non-sulfonated olefine condensation products are dissolved in it. Thus the majority of the organic compounds are sulfonic acids, namely, the sulfonic acids of different polycyclic organic compounds, aromatic hydrocarbons, compounds containing oxygen, sulfur and nitrogen, as well as nitrogen-bases and naphthenic acid.

IV. DECOMPOSITION OF SULFONIC ACIDS OF ACID SLUDGES (DESCRIPTION OF INTRODUCED COMMERCIAL PROCESSES)

A series of reactions suggest themselves for the processing and evaluation of acid sludges.

It is comparatively easy to substitute the sulfonic acid group by other groups.

Melting of the sulfonic acids with bases leads to the formation of phenols:

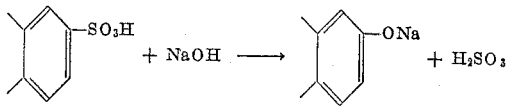

Sulfonic acid salts give aromatic nitriles by heating with potassium cyanide:

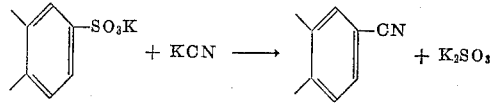

Because these reactions consume expensive chemicals and may be performed with difficulties, they can be only used for the production of individual, well defined sulfonic acids, but not for the conversion of acid sludges.

The sulfonic acid group can be changed by hydrogen too. The sulfonation is a reversible reaction.

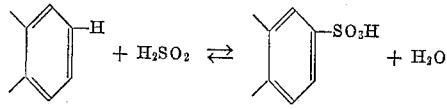

It does not proceed to a complete conversion and stops at an equilibrium position (which is determined by the construction of the compound, the temperature, etc.) at which the sulfuric acid is diluted to about 65–75% by the water formed.

Under certain conditions a reverse reaction can take place, i.e. the desulfonation reaction (hydrolysis). At elevated temperatures, on the effect of water, the sulfonic acid will be decomposed into sulfuric acid and the original compound.

Some commercial scale acid sludge conversion processes chose this reaction and operate in the way that they mix the acid sludge with water, introduce superheated steam and compressed air into the mixture and agitate it for hours, even for one or two days.

The water-containing layer—which is a dilute sulfuric acid of about 30%—is separated from the organic part by decantation. Then the weak acid will be concentrated in a complicated and expensive way to a specific gravity of 1.8 and will be used again in the chemical treatment.

The organic component will be washed acid free by cold water and the coke-like material obtained will be used as a fuel.

Most of the refineries sell the acid sludge to a sulfuric acid plant in which it will be burned together with brimstone or pyrite as a supplementary raw material. During the combustion, several sulfur compounds will be burned to sulfur dioxide which has a concentration of 6–8% and which will be used in a contact unit for the production of sulfuric acid. The organic component of the acid sludge will be wasted completely by this process.

The "Sludge Conversion Process" of the Chemical Construction Corporation overcomes the difficulties of manipulation with dilute sulfuric acid. In this process the acid sludge is fed onto glowing coke (obtained from acid sludge) and thermally decomposed in rotary kilns. A dilute, 6–8%, sulfur dioxide gas will be produced. A part of the organic component will be burned, another coked. Thus, besides coke, some liquid hydrocarbon may be obtained from the acid sludge.

V. REVIEW OF MY PROCESS

The process endeavors to utilize the acid sludges more efficiently. It starts from the point of view that the acid sludge is not only a waste material from which sulfuric acid can be recovered, but also a valuable source of the production of aromatic compounds.

According to my process the conversion of acid sludges is carried out in three phases which can be separated from one another, i.e. in accordance with the particular demands of the factory in question, only the first or the first and second phases need be introduced. The whole process with its several phases is continuous.

First phase: decomposition of sulfonic acids and free sulfuric acid present in acid sludges.

Second phase: decomposition of the other sulfur compounds.

Third phase: decomposition of the high molecular weight organic compounds of the acid sludges and production of fundamental aromatic compounds.

*First Phase: Decomposition of Sulfonic Acids and Free Sulfuric Acid Present in Acid Sludges*

(1) *Theoretical and practical principles.*—The first phase of the process is based on the reaction of desulfonation previously mentioned.

(1)
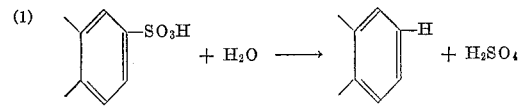

But its practical performance differs essentially from the other commercial processes used in the hydrolysis of acid sludges.

THE EXISTING DIFFERENCES (a) *No water need be given artificially to the acid sludge.*—The hydrolysis is carried out—at a corresponding temperature—by the water present in the sulfuric acid of the acid sludge. This statement might rouse the impression that the amount of water present in the 65–75% sulfuric acid of the acid sludge is not sufficient for the quantitative completion of the hydrolysis. It is verified by the results of experiments carried out with known sulfuric acids, that the hydrolysis may be performed with this quantity of water. Moreover, the hydrolysis takes place very quickly as it is catalyzed by the sulfuric acid. The more concentrated the sulfuric acid, the greater the catalytic action. The hydrolysis continues as long as the water is gradually consumed from the acid and until its concentration reaches, roughly, 95%. Under such conditions the hydrolytic decomposition—at a suitable temperature—does not last for hours or days, but only for minutes.

(b) *Sulfuric acid present in acid sludge and formed during hydrolysis is reduced to sulfur dioxide.*—The hydrolysis mentioned above will be carried out under such conditions that two other reactions will take place at the same time in conjunction with the hydrolysis. These reactions produce water for the quantitave completion of the hydrolysis and reduce the sulfuric acid present in acid sludge and formed during desulfurization, to sulfur dioxide.

Of these two reduction reactions, the first takes place more easily. The principle of this reaction is that concentrated sulfuric acid acts, at a suitable temperature, as a dehydrogenating agent on polycyclic naphtheno-aromatic compounds and converts them into the corresponding aromatic compounds. For example, tetrahydronaphthalene sulfonic acid will be converted to naphthalene sulfonic acid:

(2)
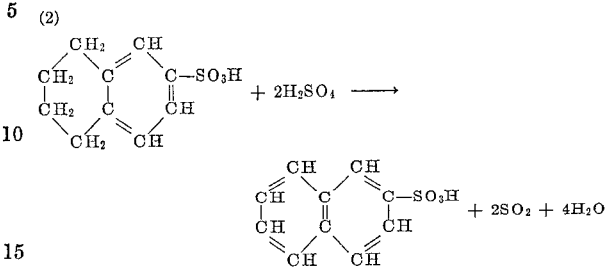

The hydrolysis (1) mentioned above and this dehydrogenation reaction (2) are in cyclic process with one another. During the hydrolysis water will be consumed gradually. For that reason and because sulfuric acid will be split off from the sulfonic acid, its concentration increases. Then the dehydrogenation starts, producing water and continuing the hydrolysis.

The second reduction reaction takes place only in the case when, as a result of the Reaction 2, all compounds which might be dehydrogenated have been exhausted from the acid sludge. The reason for this is that the number of the naphthenic nuclei was low in the polycyclic naphtheno-aromatic compounds.

In this case the free sulfuric acid reacts with the "carboid" (free carbon)—which was either originally present in the acid sludge or was added artificially to it—according to the following equation:

(3) $\quad 2H_2SO_4 + C = 2SO_2 + CO_2 + 2H_2O$ (c) *The process is carried out in a closed space and thus highly concentrated sulfur dioxide is obtained.*—
The commercial scale acid sludge regeneration processes described in section IV recover diluted sulfur dioxide gas of about 6–8%, because they burn the acid sludges (partly or completely) in air stream. On the contrary, this process operates in closed space and obtains highly concentrated sulfur dioxide, which is suitable, after drying, for the production of liquid sulfur dioxide.

The concentration of the sulfur dioxide obtained in the decomposition process depends on the Reactions 2 and 3. When only Reaction 2 takes place, a very concentrated (nearly 100%) sulfur dioxide can be obtained. The water formed during this reaction and not consumed by the hydrolyses, leaves the apparatus with the sulfur dioxide gas. Its bulk can be removed from the gases by a single cooling. Also, when Reaction 3 takes place, the sulfur dioxide contains carbon dioxide as an impurity. The quantity of the carbon dioxide reaches its maximum when only Reaction 3 takes place and Reaction 2 does not proceed at all. The maximal amount of carbon dioxide can be calculated from Equation 3:

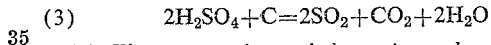

accordingly from every 196 g. concentrated sulfuric acid 128 g. $SO_2$ (about 75 wt. percent) and 44 g. $CO_2$ (about 25 wt. percent)

respectively, 44.8 l. $SO_2$ (66.6 vol. percent) and 22.4 l. $CO_2$ (33.3 vol. percent) are formed.

(The percentages given refer to the gas mixture.)

Mainly, Reaction 2 takes place in the practice and Reaction 3 only to a small degree. Therefore, the amount of $CO_2$ present in $SO_2$ is lower than that determined by the equation.

In addition, sulfur dioxide can be easily separated from $CO_2$ by compression. The liquid sulfur dioxide obtained can be used either in the refinery (for example as a selective solvent of the Edenleanu process) or sold in steel cylinders. The sulfur dioxide can be used without liquefying in refineries which produce petrochemical products too. (For example, to the production of naphthenic acids, phenols, etc., generally where sulfuric acid is used.) Of course it may be used for the manufacture of sulfuric acid after diluting it with air to the desired concentration.

(d) *The process is continuous and is easy to start and stop.*—Other processes which also operate with hydrolysis—as mentioned in section IV—carry out the hydrolysis intermittently (stirring the acid sludge for hours or for 1–2 days).

In this process the acid sludge is introduced continuously into the decomposition apparatus. Therefore it is easy to set the decomposition apparatus in operation and to switch it off depending on the formation of the acid sludges.

(e) *A "decomposer liquid" is used in the decomposition of sulfonic acids and free sulfuric acid present in acid sludges.*—This "decomposer liquid" is an organic material which is characterized by the following features:

(a) It must not decompose or distill at the decomposition temperature of the acid sludge (in the first phase).
(b) It has to be a good solvent for the organic compounds which remain after the decomposition of the sulfonic acids.
(c) It must react neither with the free sulfuric acid, with the sulfonic acids (with the exception of dehydrogenation reactions), nor with the sulfur dioxide formed during the decomposition.
(d) It must not solidify at room temperature, if possible, at the most it may be viscous.
(e) It has to be available in a large quantity and inexpensive.

For the best, this decomposer liquid is the high boiling fraction of the third phase of the acid sludge conversion which is practically a mixture of polycyclic naphtheno-aromatic compounds. If needed, all petroleum (or coal tar) products can be used for this purpose which satisfy the above-mentioned features.

The conditions of point (d) are not absolutely necessary. Also, such decomposer liquids may be used which are solid at room temperature. In this case, the manipulation of the decomposer apparatus (its start and stop) has to be performed with regard to the liquids characteristics. The decomposition is carried out in such a way that the acid sludge is continuously introduced, in a fine state of dispersion, into the decomposer liquid, which is preheated to a suitable temperature and led into the decomposer apparatus. The decomposition takes place in a few minutes and its products, according to their state of aggregation, leave the apparatus continuously and separately.

The sulfur dioxide (by chance mixed with carbon dioxide) and steam leaves the apparatus at the top. The organic component of the acid sludge, dissolved in the decomposer liquid, leaves the apparatus from the bottom.

(f) *The organic component of the acid sludge will be obtained in a non-corrosive form, which is easy to handle.*—In the other processes that operate with hydrolysis the viscous mass obtained is still acid. In order to remove this acid it will be washed with cold water, under the effect of which it becomes partly granulated. This product is then burned, mixed with coke or coal.

In contrast, the product obtained by this process is dissolved in the decomposer liquid and is easy to handle (can be pumped and stored, etc.). This product (let us call it "acid sludge rest") is not corrosive any more since it does not contain sulfuric acid. Of the sulfur compounds, only sulfides, polysulfides and cyclic compounds are present. These can be corrosive only while burning. But the bulk of these compounds will be removed in the second phase of the process.

(g) *The organic component of the acid sludge will be protected to a great extent.*—The commercial acid sludge regeneration processes burn the organic component of the acid sludges (partly or completely) in order to recover the sulfur from its sulfur compounds in form of sulfur dioxide. In contrast to this, the organic component is quantitatively at the disposal of further processing at the end of the first phase of this process.

Due to the fact that the organic component of the acid sludges is dissolved in the decomposer liquid, there is a definite advantage because:

(a) The acid sludge-rest is in a form which is easy to handle;
(b) The decomposer liquid—since it is in a cycle—returns several times into the second and third phases, where its sulfur compounds and aromatic hydrocarbons gradually decompose and yield valuable products. (Therefore, it is possible to obtain basic aromatic compounds in reworkable quantities in the third phase.)

(2) *Practical operation of the first phase of the process.*—(a) *Preparation of acid sludges.*—It is advantageous to use completely fresh acid sludges in which the condensation reactions have not advanced very far. Such comparatively not too viscous acid sludges may be handled easier and can be sprayed into the decomposer liquid in a finer state of dispersion.

It is also advantageous to mix acid sludges of different viscosity in order to obtain a lower average viscosity—supposedly that the acid sludges are formed at the same time and it is not necessary to store them for days.

The non-viscous acid sludges of gasoline, kerosene, paraffine, which contain a high percent of free sulfuric acid, are suitable for dilution of acid sludges of lubricating oils. It is even necessary from the viewpoint of the non-viscous acid sludge to mix it with lubricating oil acid sludge in order to introduce in this way the naphtheno-aromatic compounds and the "carboid" into them, which are necessary for the dehydrogenation and reduction reactions respectively (2) and (3) (see section V, b).

The lubricating oil acid sludges, mainly the ones from heavy oils, solidify gradually during storage, showing that condensation and oxidation reactions take place readily at room temperature, even more rapidly at elevated temperatures. Therefore to mix or to transport the acid sludges, elevated temperatures must be avoided because it can lead to solidifying or eventually to partial decomposition of the material.

Figure 3:
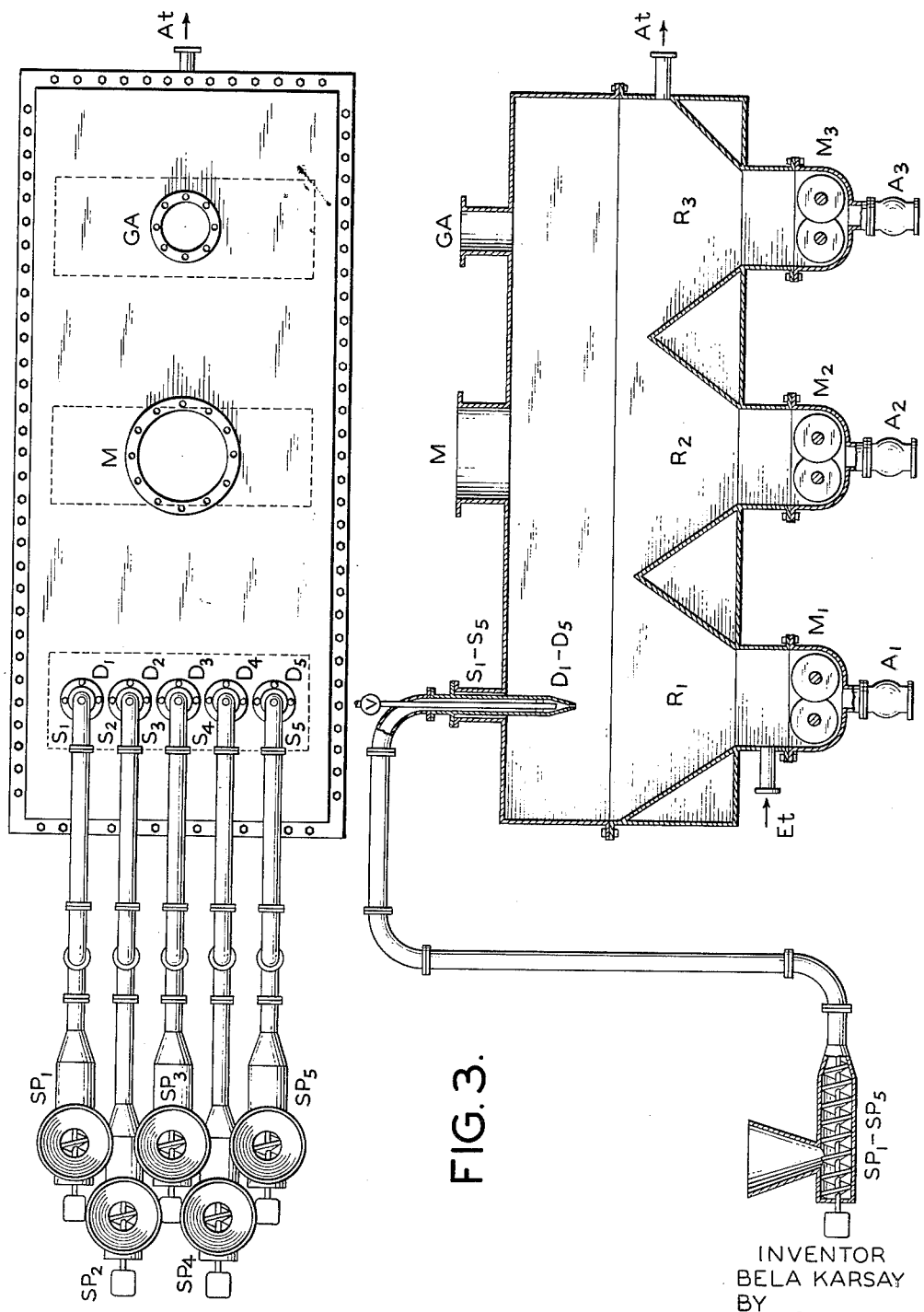

(b) *Description of the decomposer apparatus and its operation.*—The decomposer apparatus is a closed chamber. The lower part of the apparatus is a quadrangular vessel equipped with a flange (FIG. 1) which supports the deck. The vessel is divided into three conical spaces ($R_1$, $R_2$, $R_3$) in such a way that the height of the walls of these cones ($h_1$, $h_2$, $h_3$) decreases gradually. This wall system ensures the regular flow of the decomposer liquid so that it cannot form back streams. The bottoms of the three conical spaces are quadrangular openings (FIG. 1 D, E, F) equipped with flanges. The pipe ($Et$) on the side of the opening (D) serves as the entrance for the greater part of the decomposer liquid. Each of the quadrangular openings (D, E, F) is equipped with a mixing machine (FIG. 3, $M_1$, $M_2$, $M_3$). Their task is to prevent the settling and accumulation of the sprayed acid sludge and to facilitate the reaction of decomposition by stirring. The settling of the acid sludge can be prevented, furthermore, by the introduction of the decomposer liquid into the bottom of the first cone. This then flows upward opposite the sludge. The decomposer liquid in which the acid sludge-rest is dissolved leaves the apparatus through the pipe ($At$) at the third cone. The outlet valves ($A_1$, $A_2$, $A_3$) at the bottom of the apparatus are for drainage of the decomposer liquid when the operation of the apparatus must be discontinued.

The lower part of the apparatus may be made of iron because it only comes in contact with the non-corrosive decomposer liquid.

Since the upper borders of the chamber ($R_2$ and $R_3$) are in contact with wet sulfur dioxide—though at a temperature at which water cannot condense—it is still desirable to line at least these parts of the apparatus with lead.

Figure 2:
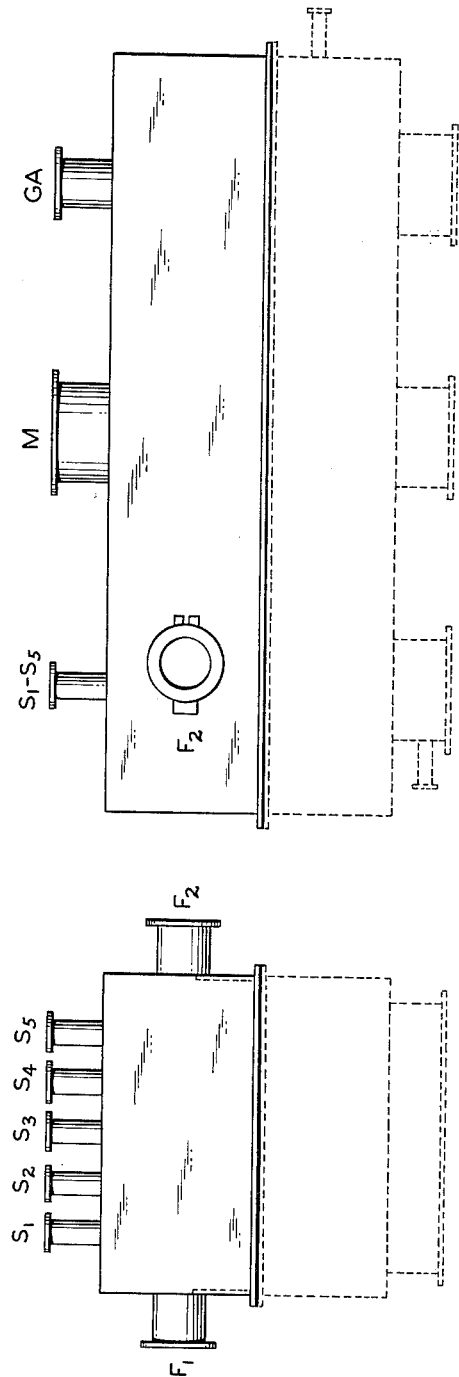

The cones of the decomposer apparatus are equipped with thermometers (FIG. 2, $T_1$, $T_2$, $T_3$).

The upper part of the decomposer apparatus is constantly in contact with wet sulfur dioxide, though at a temperature at which no water can condense. But when the apparatus is set in operation the danger of corrosion may exist. Therefore it is desirable to make it of lead, hard lead or of temperature resistant and acid-proof plastic (for example: carbate, igurite, Haveg, etc.).

Figure 4:
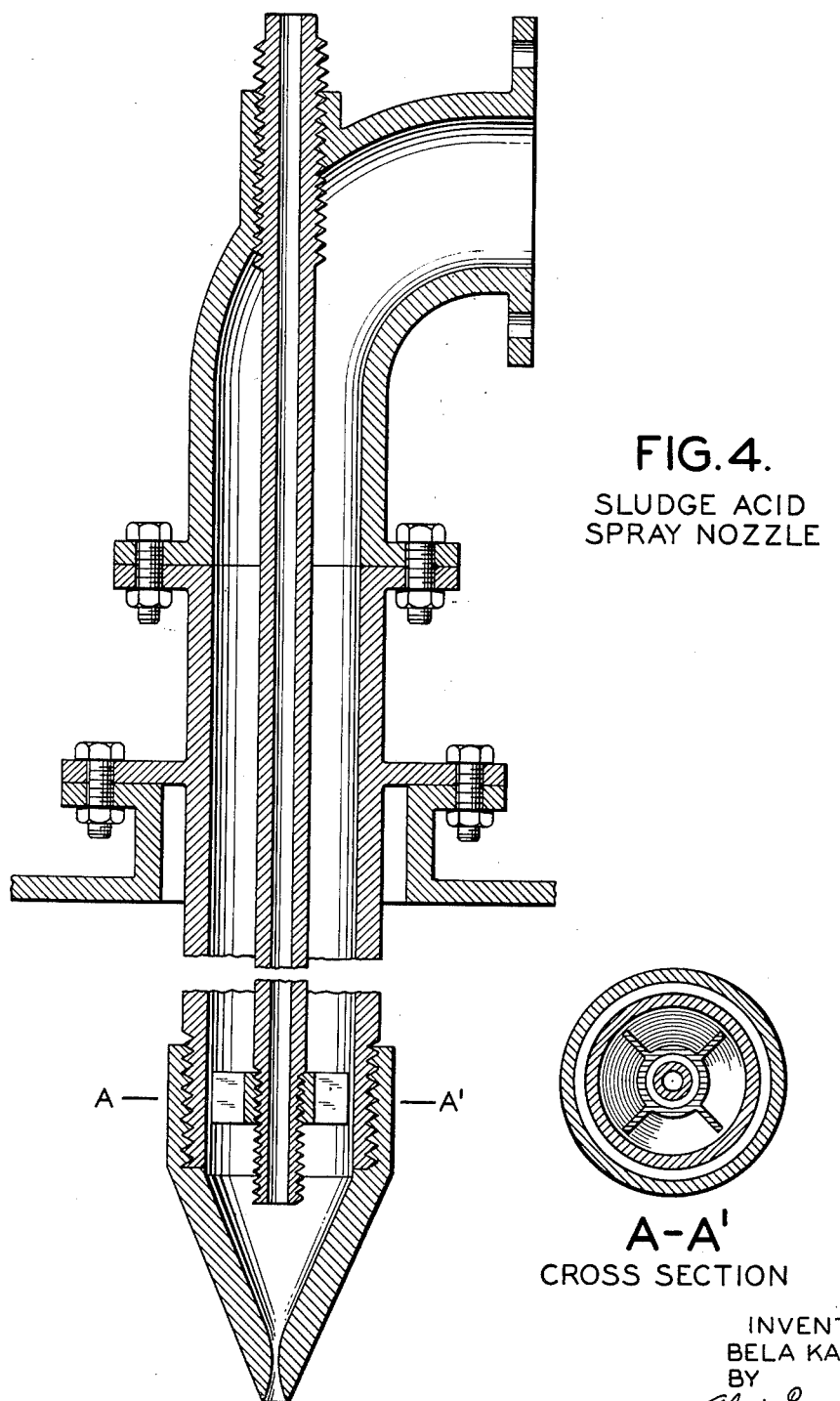

On the deck of the apparatus, just above the middle of the first cone, the acid sludge inlet (spraying nozzles) is mounted (FIG. 3). The acid sludge spray nozzles ($D_1$, $D_2$, $D_3$, etc.) reach through the pipe fittings ($S_1$, $S_2$, $S_3$, etc.) into the decomposer space ($R_1$), but above the fluid. The spray nozzles are constructed in a manner (FIG. 4) that thinner pipes are built in the inside of them. Through these, a smaller amount of the decomposer liquid will be forced. The acid sludge will be heated by this hot decomposer liquid to a temperature which makes the sludge very fluid, so that it can be sprayed in a fine state of dispersion into the decomposer area. The length of the inside pipe can be regulated by means of threaded screws, and in this way the best spraying effect can be obtained.

The proportion of acid sludge and decomposer liquid pressed through the thin pipe can be varied according to the properties of the acid sludges (between 1:0.5–1:1). Also, the spray nozzles can be changed according to the viscosity of the acid sludges.

Each of the acid sludge spray nozzles is fed separately by a screw pump (FIG. 3, $SP_1$, $SP_2$, $SP_3$, etc.). By changing the speed of rotation of the pump, the flow can be regulated.

The acid sludge comes through a transport screw (FIG. 5) from the agitators to the funnels ($Tr$) of the different screw pumps. The transport screw can serve as a mixer for the different acid sludges which are formed at the same time.

For the control of the function of the acid sludge spray nozzles, inspection ports (FIG. 2, $F_1$ and $F_2$) are built in the walls of the upper part of the decomposer apparatus. They are placed at the same height as the mouths of the spray nozzles, but a little to one side, so that all spray nozzles can be watched.

Above the second cone a hole for cleaning (M) is mounted in the deck.

Above the third cone of the apparatus the gas outlet tube (GA) is placed in the deck. This is connected to a lead cooler (FIG. 5, PbK) by a lead or plastic pipe. The water condensed here flows through a storage tank (S) into the neutralization equipment where the $SO_2$ dissolved in it is neutralized by lime.

The water-free, but still wet, sulfur dioxide gas is further processed or used.

The acid sludge decomposer apparatus is isolated entirely in order to avoid the condensation of water on the deck. The back-flow of this water to the hot liquid could cause strong foaming.

Figure 5:
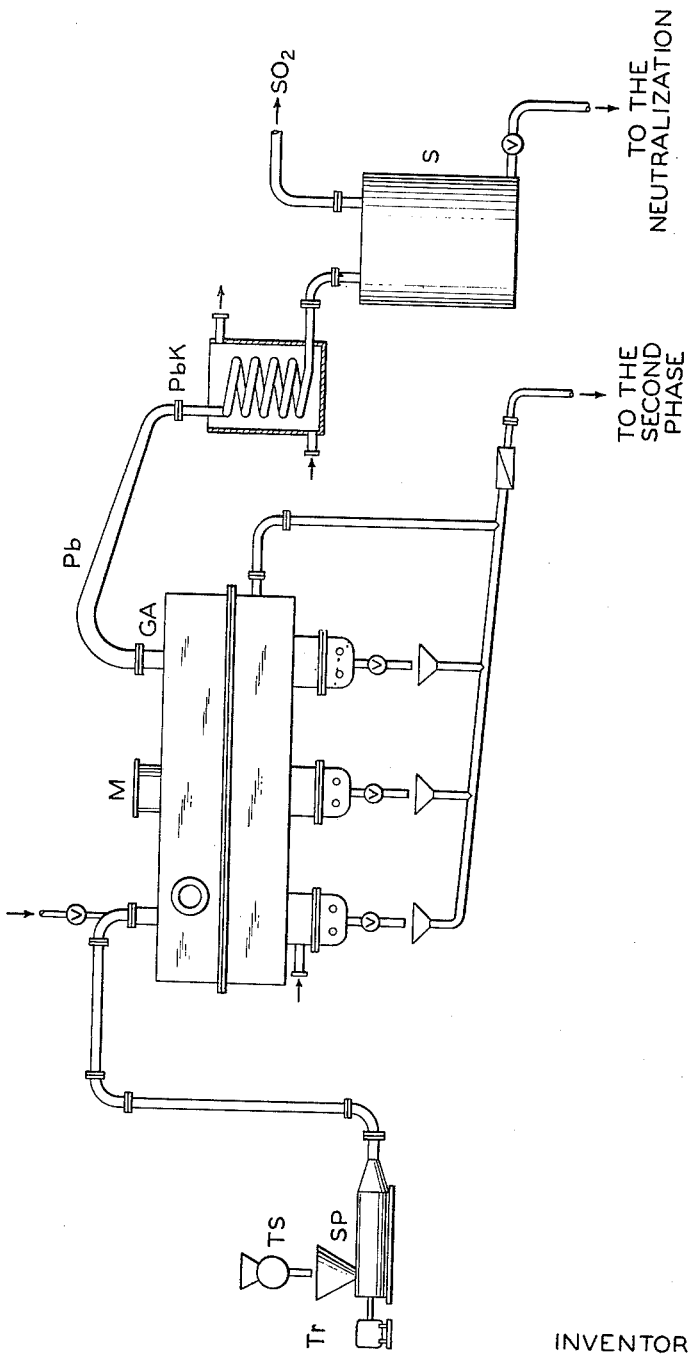

(c) *Operation of acid sludge decomposer apparatus.*— The acid sludge drained from agitators will be carried in its original fresh state into the funnels ($Tr$) of the screw pumps by a transport screw (FIG. 5, TS). From here it flows, by its own weight, into the screw pumps (SP) and pressed through the pipes and sprayed by nozzles into the gas space of the decomposer apparatus and drops into the decomposer liquid which is preheated to a temperature of 180–230° C. The proportion of acid sludge and decomposer liquid in the decomposer apparatus is between 1:1–1:4 depending on the viscosity and on further processing necessary for the acid sludge-rest.

The acid sludge, in a fine state of dispersion, gets to the decomposer liquid which flows in the opposite direction and is better divided and mixed with the decomposer liquid by the mixing machine. In this manner, the decomposition takes place in a very short time and is practically finished in the first cone of the apparatus. The second and third cones ensure its quantitative performance.

The fluid which leaves the decomposer apparatus (mixture of decomposer liquid and acid sludge-rest) will be pumped to a storage tank and serve as the charging stock for the second phase of the process.

The wet sulfur dioxide gas formed (every 128 g., i.e. 44.8 1. $SO_2$ contains 36–72 g. water) goes through a lead cooler in which the water is condensed.

If the sulfur dioxide is to be liquefied, intensive cooling has to be used in this cooler in order to remove the water from gas as much as possible, allowing relatively dry gas to get to the drying apparatus. In other cases it is better to use mild cooling in order to keep the condensed water warm reducing the loss of sulfur dioxide.

The sulfur dioxide gas leaving the cooler will be forced by a pump, which is installed in a circulating cycle thus keeping the decomposer apparatus under a mild vacuum, to the gas liquefaction plant or to other uses.

*Starting operation of the apparatus.*—At first only decomposer liquid will be introduced until the walls of the apparatus are warmed and water will not condense. Then the acid sludge charge can be started.

Shutdown of the decomposer apparatus is a little more complicated. Namely, the acid sludge pipes have to be washed out by hot decomposer liquid. The washing oil is then drained through the valves ($U_1$, $U_2$, $U_3$).

*Second Phase: Decomposition of Other Sulfur Compounds*

(1) *Theoretical and practical principles.*—The acid sludge-rest obtained from the first phase is practically free of sulfonic and sulfuric acids. It contains the following organic materials:

(*a*) Nitrogen compounds: the derivatives of pyridine, quinoline, isoquinoline, acridine, naphthoquinoline, etc.
(*b*) Sulfur compounds: free sulfur, aliphatic sulfides, polysulfides, cyclic sulfides, thiophenes, etc.
(*c*) Resinous and asphaltic materials.
(*d*) Polycyclic (naphtheno-) aromatic compounds, and
(*e*) Naphthenic acids.

Actually it contains the same compounds which have been present in the acid sludge in the form of sulfonic acids.

During the decomposition of the first phase, an essential change took place in the rows of the resinous and asphaltic materials and the polycyclic naphtheno-aromatic compounds. These compounds, which already possess an aromatic character before the sulfuric acid treatment— otherwise it would not attack them—undergo a further change of character in the first phase and become more aromatic.

One part of the naphthenic nuclei loses its hydrogen atoms by the dehydrogenating action of sulfuric acid and becomes aromatic. The quantity of aromatic materials in the acid sludge-rest increases to a point where it becomes a valuable source of aromatic compounds. The sulfur compounds present in the acid sludge-rest can continue the dehydrogenation process, at a suitable temperature. Thus, polysulfides, by heating to their boiling points, set sulfur free:

$$CH_3S_4CH_3 \rightarrow S + CH_3S_3CH_3$$

$$CH_3S_5CH_3 \rightarrow 2S + CH_3S_3CH_3$$

Also, the thermal decomposition of resinous and asphaltic material can yield free sulfur.

The free sulfur present in acid sludge causes, at a temperature of about 230–250° C., an aromatizing (dehydrogenating) action on the naphthenic rings:

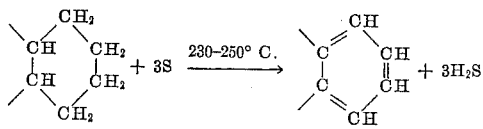

Disulfides act similarly dehydrogenating on aromatic compounds:

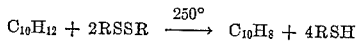

In the first phase of the process the temperature of 180–230° C. was intentionally chosen, causing these last reactions not to take place and thus the sulfur dioxide gas cannot be contaminated by hydrogen sulfide and the lead cooler will not become clogged by sublimated sulfur.

With a small increase in temperature (to about 260° C.) the appearance of hydrogen sulfide shows that decomposition reactions taken place. At 330, 345, 375 and 390° C., newer decompositions may be observed which are characterized by the appearance of hydrogen sulfide and sublimation of sulfur.

At these temperatures, high molecular cyclic sulfur compounds (resins and asphaltic materials) decompose to simpler sulfur compounds, thus mercaptane, derivatives of thiophene, etc. are formed. These latter compounds decompose further and produce hydrogen sulfide in addition to hydrocarbons:

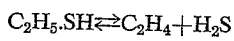

(2) *Practical operation of the second phase of the process.*—The charging stock of the second phase is the acid sludge-rest dissolved in the decomposer liquid, as it comes from the first phase. It is collected in a storage tank (FIG. 6, 1). This stock will be heated in a pipe still 2 to a temperature of 350–400° C. (either at atmospheric or at moderate pressure) in order to decompose the sulfur compounds. The hot fluid will be introduced into an empty cracking cylinder 3 through which it flows slowly. The fluid goes from here into the empty cooling tower 4 where the decomposition products will be cooled and separated. The bottom of the tower is conical and has a discharge valve. The liquid enters at the middle of the tower. The hydrogen sulfide gas, sulfur vapor and the other vaporous products, formed during the decomposition, stream upward in the tower while the liquid high molecular weight compounds flow downward.

If a suitable cooling liquid is sprayed into the tower, a good separation of the different products may be reached. This cooling liquid has to possess the following properties:

(a) A density higher than 1.200 (i.e., it has to be heavier than the heaviest aromatic compound of the decomposed acid sludge and/or acid sludge-rest);
(b) A boiling point which lies above the melting point of the sulfur;
(c) Should not react with the product of decomposition (if necessary it may react with one part of them);
(d) Should not be soluble in the oily product;
(e) Easy to obtain.

Concentrated hot solutions of different salts (calcium chloride, magnesium chloride, etc.) and bases can be used as cooling liquids. For example, if a suitable solution of CaCl$_2$ is sprayed into the tower at a temperature of about 120–125° C., all products of the decomposition may be condensed—with the exception of the hydrogen sulfide gas—forming three layers on the bottom of the tower:

(a) The lowest layer is sulfur which is in a melted state and can be drained from the tower;

(b) The middle layer is the calcium chloride solution, and
(c) The upper layer is the organic liquid.

The salt solution and organic liquid leave the tower by a side pipe and get to a settler 5. Here the salt solution will be separated from the oil and will be recirculated as a cooling liquid into the tower.

The H$_2$S gas leaving the tower can be utilized as such or can be burned to sulfur dioxide at a temperature of 350–380° C. For example, if caustic soda solution is used as a cooling agent, the H$_2$S formed can be absorbed and sodium sulfide can be produced. The organic liquid, separated from the salt solution, flows into a storage tank and serves as the charging stock for the third phase.

*Third Phase: Decomposition of the High Molecular Weight Organic Compounds of Acid Sludges and Production of Fundamental Aromatic Compounds*

The charging stock of the third phase is the partially decomposed acid sludge-rest dissolved in the decomposer liquid which comes from the second phase and to a great extent is free of sulfur compounds. Its chief components are:

(a) Polycyclic (naphtheno) aromatic compounds;
(b) Resinous and asphaltic materials;
(c) Different nitrogen and oxygen compounds.

The high molecular organic compounds mentioned above undergo decomposition during the second phase and are in a non-viscous form before the third phase.

The task of the third phase is:

(a) To continue the thermal decomposition of the large molecules;
(b) To separate the products of the decomposition from the tar;
(c) To separate the products of decomposition from each other in order to produce valuable fundamental aromatic compounds.

For this purpose the charging stock, which comes from the second phase of the process, will be heated in a pipe still at a temperature of 400–450° C. and introduced into a separator 3 in order to separate the volatile products from the tar. The tar can be used as such or can be coked.

The vapors which leave the separator will be fed into a fractionating tower 4 and separated into several fractions.

The top product and the lighter fractions contain fundamental aromatic compounds (such as toluene, pyridine, xylenes, naphthaline, quinoline, methylnaphthalenes, etc.) which can be further processed and separated, probably to coal tar.

The bottom product will be recycled to the first phase and used there as the decomposer liquid.

Although certain preferred embodiments of the invention have been disclosed for purpose of illustration, it will be evident that various changes and modifications may be made therein without departing from the scope and spirit of the invention.

I claim:

A continuous process for the decomposition of acid sludge obtained from the sulfuric acid treatment of petroleum products which comprises maintaining a body of acid sludge and decomposer liquid composed of liquid hydrocarbons containing sufficient polycyclic naphtheno-aromatic hydrocarbons to convert the free sulfuric acid content of the acid sludge to sulfur dioxide in an enclosed zone to prevent the introduction of extraneous gas at a temperature within the range of about 180–230° C., the proportion of acid sludge to decomposer liquid in the zone being within the range of 1:1 to 1:4 by weight, continuously introducing acid sludge having less than about 75% free sulfuric acid into said body, continuously introducing heated decomposer liquid into the body of acid sludge and decomposer liquid to maintain said body at a temperature within the range of 180°–230° C. to convert sulfonic acids and free sulfuric acid in the acid sludge to sulfur dioxide and water while converting naphtheno-aromatic hydrocarbons to aromatic hydrocarbons, continuously discharging the liquid mixture of decomposer liquid and acid sludge substantially free of sulfonic acids and free sulfuric acid from the first zone, continuously releasing a gas stream containing primarily sulfur dioxide and water from the first zone, heating in a second zone said mixture of decomposer and liquid acid sludge discharged from said first enclosed zone to a temperature within the range of about 260° C. to 400° C., to convert at said temperature residual sulfur compounds in the mixture into hydrogen sulfide, separating the hydrogen sulfide from the mixture, discharging from the second zone the liquid mixture of acid sludge and decomposer liquid substantially free of sulfur compounds, heating the liquid mixture discharged from the second zone to a temperature above 400° C. to 450° C. whereby the high molecular weight polycyclic compounds in the acid sludge are converted to lower molecular weight volatile compounds, separating the volatile constituents from the mixture leaving as a residue a tar, discharging the tar from the system, withdrawing from the system low molecular weight aromatic compounds containing aromatic compounds selected from the group consisting of one and two ring aromatic compounds, and recirculating polycyclic naphtheno-aromatic hydrocarbons of the volatile constituents as decomposer liquid to the first enclosed zone.

References Cited in the file of this patent

UNITED STATES PATENTS

| | | |
|---|---|---|
| 1,823,594 | Diggs | Sept. 15, 1931 |
| 1,862,060 | Moser et al. | June 7, 1932 |
| 1,953,225 | Hechenbleikner | Apr. 3, 1934 |
| 1,997,980 | Smith | Apr. 16, 1935 |
| 2,043,646 | Bahlke | June 9, 1936 |

FOREIGN PATENTS

| | | |
|---|---|---|
| 398,023 | Great Britain | Sept. 7, 1933 |